United States Patent

Kanai et al.

Patent Number: 5,296,312
Date of Patent: Mar. 22, 1994

[54] NON-MAGNETIC SUBSTRATE MATERIAL AND FLOATING-TYPE MAGNETIC HEAD

[75] Inventors: Kunio Kanai, Kounosu; Masashi Yamaguchi, Maoka, both of Japan

[73] Assignee: Hitachi Metals Limited, Tokyo, Japan

[21] Appl. No.: 997,921

[22] Filed: Dec. 29, 1992

[30] Foreign Application Priority Data

Jan. 28, 1992 [JP] Japan ............................ 4-012683

[51] Int. Cl.⁵ .............................................. G11B 5/147
[52] U.S. Cl. .................................. 428/702; 360/120; 360/122; 360/125; 360/127; 501/127; 501/105; 428/697; 428/701
[58] Field of Search ............... 360/120, 122, 125, 127; 501/105, 127; 428/697, 701, 702

[56] References Cited

U.S. PATENT DOCUMENTS

| | | | |
|---|---|---|---|
| 4,430,440 | 2/1954 | Wada et al. | 501/105 |
| 4,689,270 | 8/1987 | Deckelmann et al. | 428/701 |
| 4,901,179 | 2/1990 | Satomi et al. | 360/126 |
| 4,959,330 | 9/1990 | Donohue et al. | 428/702 |
| 5,097,391 | 3/1992 | Nomura et al. | 361/321 |

FOREIGN PATENT DOCUMENTS 57-95872 6/1982 Japan.
59-213672 12/1984 Japan.
2-243562 9/1990 Japan.

*Primary Examiner*—A. A. Turner

[57] ABSTRACT

A non-magnetic substrate material which contains 0.5%–3% of $Al_2O_3$ and 3%–16% of at least either ZnO or $SnO_2$ (but with $ZnO+SnO_2 <= 16\%$) in addition to components of 45%–60% of $TiO_2$, 5%–20% of BaO and 20%–35% of CaO, and a floating-type magnetic head with a slider made of the above-mentioned non-magnetic substrate material.

11 Claims, 4 Drawing Sheets

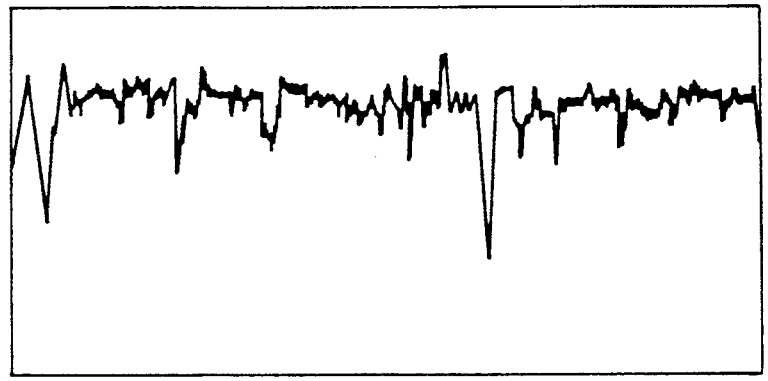
F I G . 3A
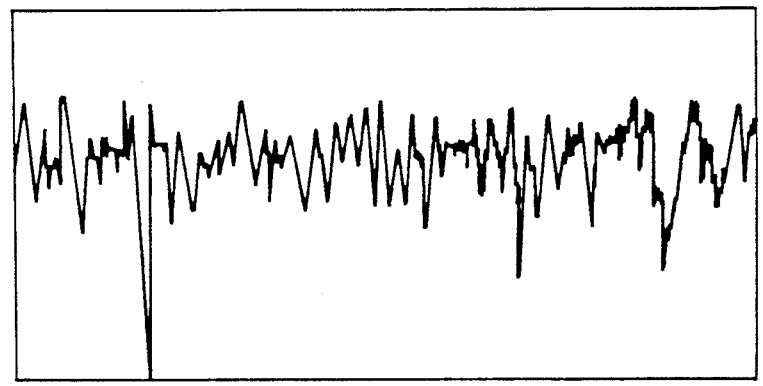
F I G . 3B

NON-MAGNETIC SUBSTRATE MATERIAL AND FLOATING-TYPE MAGNETIC HEAD

BACKGROUND OF THE INVENTION

1. Field of the Invention

This invention relates to a non-magnetic substrate material to be used for floating-type magnetic head sliders for high frequency, high density storage magnetic disk units, and to a composite-type floating magnetic head (hereinafter sometimes called "Composite Type Head") and thin film-type floating magnetic head (hereinafter sometimes called "Thin Film Head") for which the abovementioned material is used.

2. Related Art

Magnetic disks have been used for 3.5", 2.5" and high density compact magnetic disk units and are available in two types, the composite type head disk unit which is shown in FIG. 1 and currently the most popular, and the thin film head type disk unit which is shown in FIG. 2 and which is likely to be increasingly used as further advances are made in densification.

In FIG. 1, element 11 is the composite-type floating magnetic head and element 12 is a slider composed of non-magnetic materials, such as ceramics. A magnetic head core 13 is fixed and retained in a slit 14 formed in an air bearing 16 with molded glass 15.

FIG. 4 is a perspective view showing magnetic head core 31, generally referred to in FIG. 1 as element 13. The magnetic head core 31 consists of a pair of facing core blocks 32 and 33, having a magnetic gap 37 between them. Soft magnetic alloy thin films 35 and 36, are formed by sputtering on both core blocks and are reinforced with glass 34 for adhesion.

The above magnetic head core is generally made of Mn—Zn single crystal ferrite with a thermal expansion coefficient of about $110 \times 10^{-7}/°C$. The magnetic head core is set in the slider slit and fixed with glass as discussed above with reference to FIG. 1. Thus, if the thermal expansion coefficient is substantially different from that of the slider, the glass will be easily cracked. Consequently, it is necessary to approximate the thermal expansion coefficient of the magnetic head core to that of the slider.

A non-magnetic substrate material suitable for such composite-type sliders is one composed of a Ti-O$_2$—BaO—CaO component, such as disclosed in Japanese Patent Laid-Open Publication No. 243562/1990, along with at least one additive of Al$_2$O$_3$, NiO, SrO, MgO, Y$_2$O$_3$, WO, MoO$_3$, In$_2$O$_3$ and ZrO$_2$. The thermal expansion coefficient of this non-magnetic substrate material is about $115 \times 10^{-7}/°C$, which is close to that of Mn—Zn ferrite for the magnetic head core. The additive, such as Al$_2$O$_3$, makes a finer crystal grain, reduces gaps between crystal grains and makes them uniform. Thus, this non-magnetic substrate material can be easily machined with substantially reduced chipping and is regarded as a superior material for this type of application.

FIG. 2 is a perspective view showing a thin film-type magnetic head as an example, wherein element 20 is a magnetic head, 21 element is an air bearing, element 22 is an electromagnetic converter and element 23 is a slider. The electromagnetic converter generally forms Al$_2$O$_3$ film on the ends of the non-magnetic slider and also forms amorphous or other thin film on it according to lithographic thin-film technology. Therefore, from the aspects of manufacture and operation, it is necessary to retain a proper relationship between their thermal expansion coefficients. The slider is generally made of a substrate material composed principally of alumina-titanium carbide (ATC).

To ensure that the quality of magnetic disk units corresponds to that of modern high-density recording, hard disks, as magnetic recording media, feature disk boards onto which the magnetic substance is closely adhered by plating or sputtering techniques.

The surfaces of the abovementioned disk boards finished by plating or sputtering are of a higher level of accuracy than those finished by conventional painting. However, since lubricant is coated over the surface, an unprecedented problem known as a sticking phenomenon occurs between the head and disk surfaces. In other words, when the surface accuracy of a plane opposite a magnetic recording medium is improved, the stationary disk surface and head surface opposite the disk stick together. If the adhesive strength between the head and disk increases excessively, it will exceed the torque of the motor which rotates the disk. Consequently, operation of the disk unit is drastically impaired. At the same time, CSS (Contact Start and Stop) life is shortened. This constitutes a serious problem for small magnetic disks which require a flying height of less than 0.1 μm.

To improve the CSS property, various studies have also been carried out on magnetic disks which are processed by a texture. Texture process is a process whereby numerous irregularities are formed on the disk board, where average surface roughness is about 10 nm and pitch between peaks and valleys of irregularities is 100 to 200 nm, as indicated in FIGS. 3A and 3B measured in the radial direction of the disk by HIPOSS (Tracer-type minute shape measuring instrument). After the texture process, the disk board is covered with a primer film of Cr, then with metallic magnetic thin film of Co—Cr—Ta, etc. by sputtering and is finally protected with carbon film. These irregularities processed by the texture, reduce contact area between the magnetic head and the air bearing face and provide appropriate adhesive strength.

On the other hand, the non-magnetic substrate material to be used for the slider of the composite type head is made of the TiO$_2$—BaO—CaO component and at least one additive of Al$_2$O$_3$, NiO, SrO, MgO, Y$_2$O$_3$, WO, MoO$_3$, In$_2$O$_3$ and ZrO$_2$ and is suitable for the slider in terms of thermal expansion coefficient and processability. However, its Vickers hardness is about 850 Kg/mm$^2$ which is higher than that of the disk processed by texture. The magnetic head slides the protective film at flying and landing, and the peak sections of the disk irregularities processed by texture are to be partly damaged.

Also, alumina-titanium carbide to be used for the substrate which forms the slider of the thin film head causes problems with lubrication of disk or recording medium, due to titanium carbide being active, and is more uncongenial to a disk than TiO$_2$—BaO—CaO non-magnetic substrate material because the Vickers hardness is as high as 2,000 Kg/mm$^2$, and has problems in regard to its processability.

SUMMARY OF THE INVENTION

It is an object of the present invention to solve the above-mentioned problems. Accordingly additives were studied for the TiO$_2$—BaO—CaO component disclosed above to provide a non-magnetic substrate material which retains good processability and thermal expansion coefficient of conventional non-magnetic substrate materials and is of the required hardness to produce a floating-type magnetic head and slider having good CSS property, especially in relation to a magnetic disk processed by texture.

The non-magnetic substrate material of the present invention contains 0.5%–3% of $Al_2O_3$ and 3%–16% of either ZnO or $SnO_2$ or both (but with $ZnO+SnO_2 <= 16\%$), in addition to the main components of 45%–60% of $TiO_2$, 5%–20% of BaO and 20%–35% of CaO in percentage by weight, and its Vickers hardness is reduced below 800 Kg/mm$^2$ to improve the CSS property when used as a slider.

Also, even if 0.01%–6% of at least one of NiO, SrO, MgO, $Y_2O_2$, WO, $MoO_3$, $In_2O_3$ and $ZrO_2$ is added in percentage by weight, the non-magnetic material can maintain a good CSS property as a slider.

Floating-type thin film heads or composite-type heads with sliders made of such non-magnetic substrate material are suitable for magnetic disk units which require compact high density magnetic heads with a flying height of less than 0.1 μm.

If the percentages by weight of $TiO_2$ and CaO are out of the respective ranges of 45%–60% and 20%–35%, the $TiO_2$—BaO—CaO component becomes unstable concerning the degree of sintering. If BaO is less than 5%, the processability becomes unsatisfactory, and if more than 20% by weight, the component also becomes unstable concerning the degree of sintering.

The additive, $Al_2O_3$, is effective in homogenizing the non-magnetic substrate material since in forming compounds with $TiO_2$, BaO and CaO, it causes their crystal grains to become minute, thereby reducing gaps between crystal grains. However, if it is less than 0.5% by weight, it is not effective, and if more than 3%, its CSS property is deteriorated. ZnO or $SnO_2$ are auxiliary additives to $Al_2O_3$ to improve the degree of sintering and also to achieve the appropriate hardness. If less than 3%, however, it becomes ineffective, and if more than 16%, the degree of sintering is deteriorated, and gaps between crystal grains increase.

NiO, SrO, MgO, $Y_2O_3$, WO, $MoO_3$, $In_2O_3$ and $ZrO_2$ are also effective in improving the degree of sintering and to make the thermal expansion coefficient appropriate. If, however, they are less than 0.01%, they are not effective in relation to the $Al_2O_3$ content, and if more than 6%, the degree of sintering is deteriorated. Also, it is desirable for the total amount of additives, such as $Al_2O_3$, to be less than 22% to maintain hardness, thermal expansion coefficient, degree of sintering, etc. of the $TiO_2$—BaO—CaO component.

Since the non-magnetic substrate material has fine crystal grains and few cavities and is homogenized, hardly any chipping occurs in machining it. When sliders of this material slide on magnetic disks, there is little falling off of particles. Such sliders are relatively hard and seldom cause damage to certain sections of peaks and valleys of magnetic disks processed by texture.

BRIEF DESCRIPTION OF THE DRAWINGS

FIGS. 3A and 3B are graphs showing roughness curves measured in the radial direction of a disk with an HIPOSS (Tracer type minute shape measuring instrument).

DETAILED DESCRIPTION OF THE PREFERRED EMBODIMENTS

The present invention is explained further in accordance with the preferred embodiments.

Embodiment 1

$Al_2O_3$, ZnO, $SnO_2$, NiO, SrO, MgO, $Y_2O_3$, WO, $MoO_3$, $In_2O_3$ and $ZrO_2$ were added to the main materials of $TiO_2$, BaO and CaO, and were mixed wet and calcined at temperatures from 1,000° to 1,200° C. The calcined materials were then pulverized wet, granulated and formed into compact blocks of 60×30×13 mm. These compact blocks were then burnt at temperatures of from 1,230° to 1,300° C., hot-pressed in a hydrostatic press and heat-treated in the atmosphere to form the non-magnetic substrate material. Table 1 shows relationships between main component compositions, additive contents and hardness.

TABLE 1

| | Composition (wt %) | | | | | Hardness |
|---|---|---|---|---|---|---|
| | $TiO_2$ | BaO | CaO | $Al_2O_3$ | Other additives | Kg/mm$^2$ |
| Embodiment | | | | | | |
| 1 | 47.5 | 7.0 | 29.49 | 0.7 | ZnO:14.3, $SnO_2$:1.0, $ZrO_2$:0.01 | 670 |
| 2 | 48.98 | 16.8 | 23.0 | 1.1 | ZnO:10.1, $ZrO_2$:0.02 | 710 |
| 3 | 51.88 | 11.1 | 25.9 | 0.8 | ZnO:10.2, $ZrO_2$:0.02, Mgo:0.1 | 710 |
| 4 | 51.7 | 11.25 | 25.9 | 3.1 | ZnO:8.0, $ZrO_2$:0.02 | 730 |
| 5 | 58.8 | 7.7 | 29.5 | 1.5 | ZnO:1.5, $Y_2O_3$:1.0 | 770 |
| 6 | 52.3 | 11.9 | 26.3 | 1.1 | $SnO_2$:5.3, $In_2O_3$:3, WO:0.1 | 780 |
| 7 | 54.6 | 12.6 | 27.38 | 0.5 | ZnO:4.9, $ZrO_2$:0.02 | 780 |
| 8 | 52.7 | 12.3 | 26.5 | 1.2 | $SnO_2$:5.3, NiO:2.0 | 800 |
| Comparative example | | | | | | |
| 1 | 55.8 | 13.1 | 27.5 | 1.0 | ZnO:2.3, $ZrO_2$:0.3 | 905 |
| 2 | 59.1 | 7.7 | 30.5 | 0.7 | $ZrO_2$:1.0, $MoO_3$:1.0 | 910 |
| 3 | 60.0 | 8.1 | 31.2 | 0.7 | | 930 |

Table 1 shows that hardnesses of the non-magnetic substrate materials of the present invention are favorably less than 800 Kg/mm$^2$ and that this material is suitable as a substrate material for a slider of a good CSS property. Non-magnetic substrate materials as a comparative example, contain ZrO$_2$ but contain only less than 3% of ZnO or SnO$_2$, so their hardness is higher than 800 Kg/mm$^2$.

Embodiment 2

The non-magnetic substrate of Embodiment 1 was machined to form a slider. Fe—Al—Si metallic magnetic films 2 μm thick were formed on pairs of concave and flat plate sections which are to compose facing Mn—Zn single crystal ferrite substrates with a magnetic gap between them.

Figure 1:
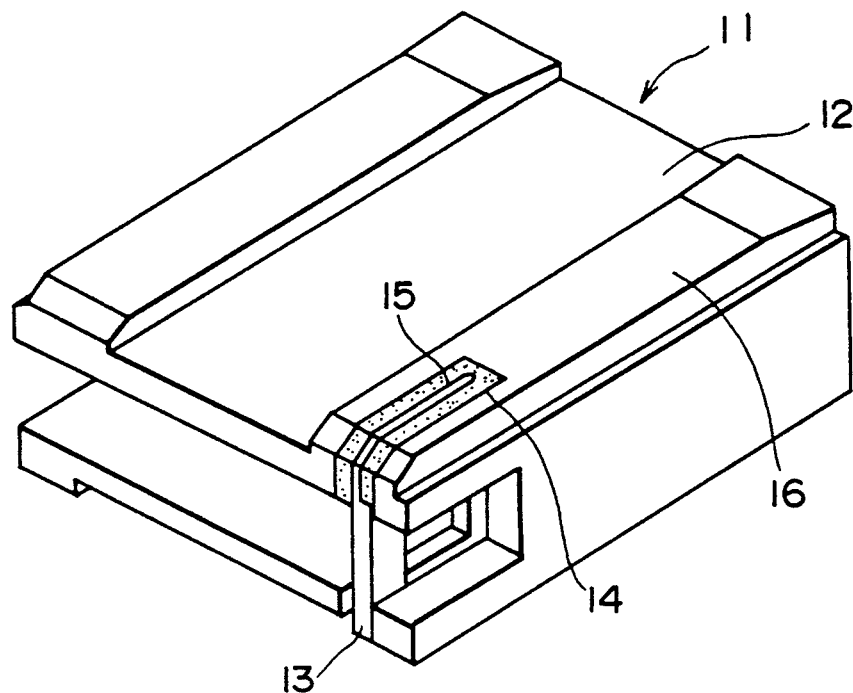
FIG. 1 is a perspective view of the composite-type floating magnetic head with slider made of the non-magnetic substrate material of the present invention.
Figure 2:
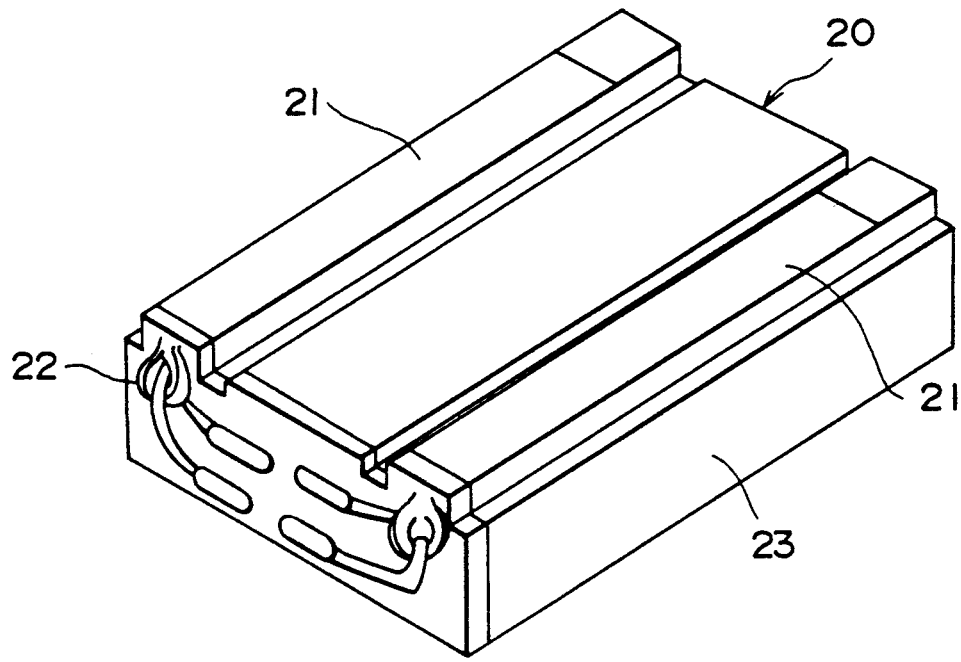
FIG. 2 is a perspective view of the thin film-type floating magnetic head with slider made of the non-magnetic substrate material of the present invention.
Figure 4:
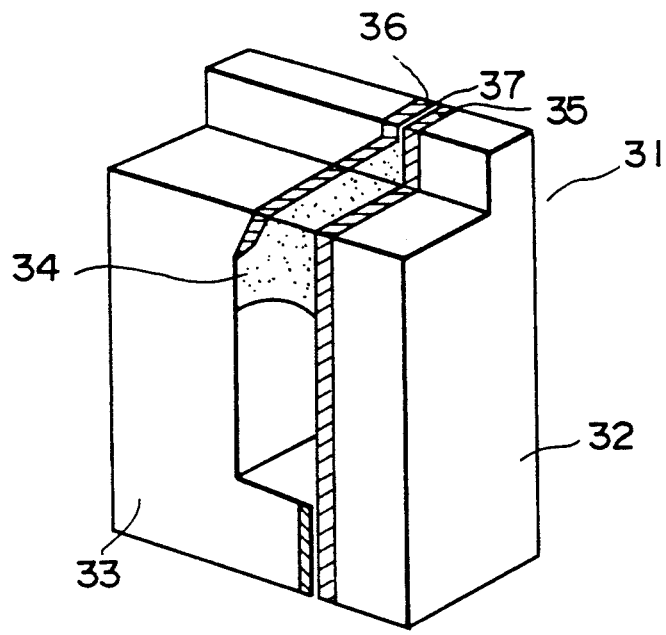
FIG. 4 is a perspective view of a magnetic head core to be used for the composite-type floating magnetic head of the present invention.

SiO$_2$ films were formed by sputtering on the gap-designated portions of the Mn—Zn single crystal ferrite substrates having the concave and flat plate sections. Then, both substrates were bonded with glass (PbO—SiO$_2$—Al$_2$O$_3$—B$_2$O$_3$—BaO—Na$_2$O). The bonded substances were cut, lapped and notched so as to restrain track width, and were shaped into magnetic head cores as shown in FIG. 4. The magnetic head cores were set in the slider slits previously produced and fixed with molded glass (PbO—SiO$_2$—Al$_2$O$_3$—B$_2$O$_3$) at 530° C. The opposite faces of the recording media were finished to produce composite-type floating magnetic heads measuring 0.65 mm in height, 3 mm in length and 2.5 mm in width.

A CSS property test was conducted on the produced floating-type magnetic heads. The test conditions were as follows: 3.5" hard disk (Substrate: Aluminum, Primer film: Cr, Magnetic film: Co—Cr—Ta by sputtering), peripheral speed: 9.4 m/sec. For evaluation, a force of about 9.5 g-f was applied to the magnetic head placed on a stationary magnetic disk with a gimbal, then the required torques to start rotating the magnetic disks were measured. Such torques were converted into coefficient of friction which shall be less than 1.0 or 0.7 favorably.

Figure 6:
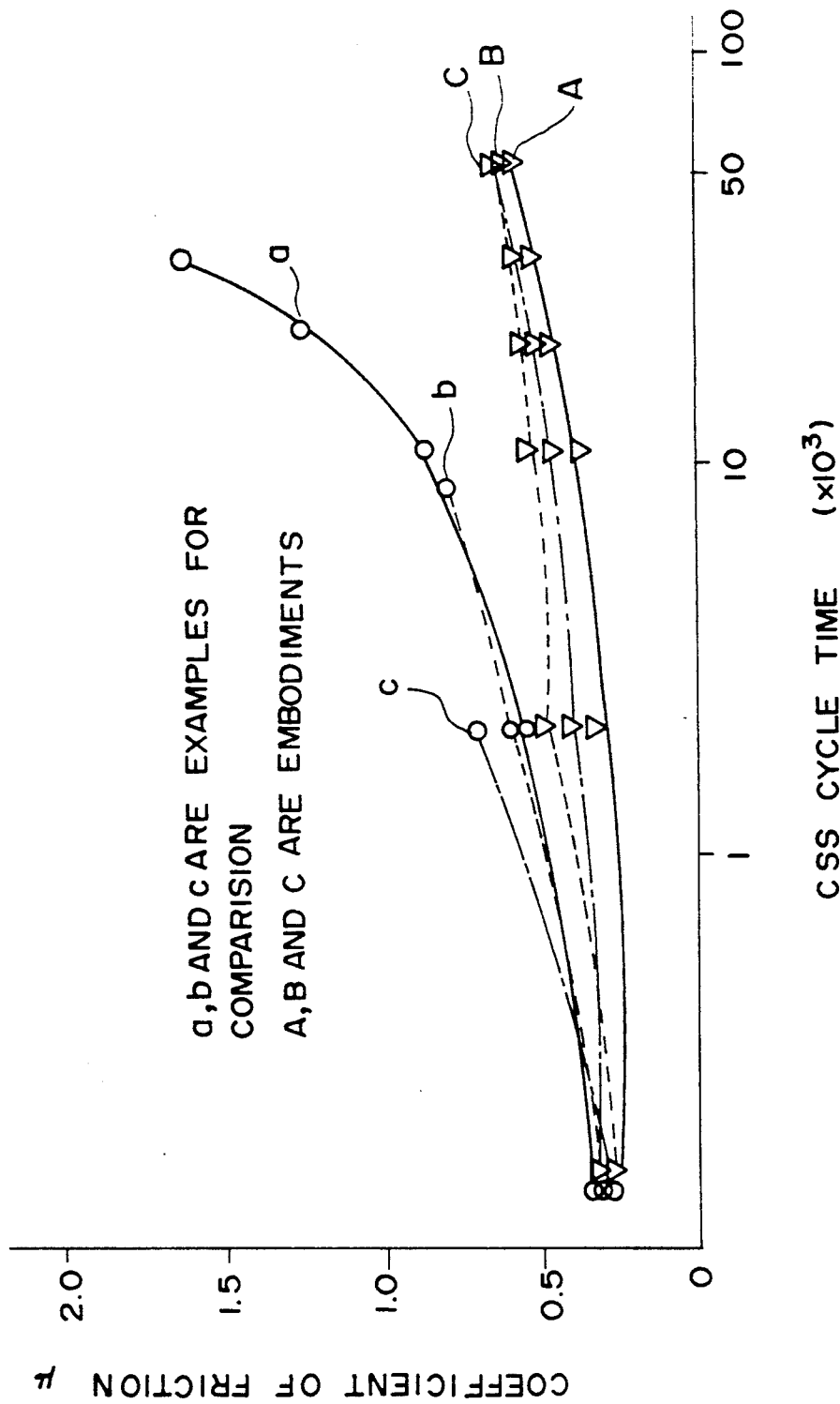
FIG. 6 is a graph showing a comparison of CSS property between the floating-type magnetic heads using material of the present invention and those heads made of conventional material.

FIG. 6 is a graph showing a comparison of the CSS property between a floating-type magnetic head with a slider made of the non-magnetic substrate material of the present invention and a floating-type magnetic head with a slider made of the conventional material.

Concerning floating-type magnetic heads A, B and C with sliders made of non-magnetic substrate material of embodiments 2, 5 and 7 (Table 1), the coefficients of friction were less than 0.7, even after a CSS frequency of 50,000. Concerning floating-type magnetic heads a, b and c using the non-magnetic substrate materials of comparative examples 1, 2 and 3 (Table 1), the coefficients were more than 0.7 at a CSS frequency of 50,000. Especially, in the case of floating-type magnetic head "a" using the non-magnetic substrate material 3 of Vickers hardness as high as 930 Kg/mm$^2$, the coefficient exceeded 0.7 at 20,000 times of CSS. In case of floating-type magnetic head "c" using the non-magnetic substrate material of Vickers hardness of 905 Kg/mm$^2$ (comparative example 1), the coefficient was more than 1.5 at about 40,000 times of CSS. It is clear, therefore, that the non-magnetic substrate materials of the present invention improve the CCS property.

Figure 5:
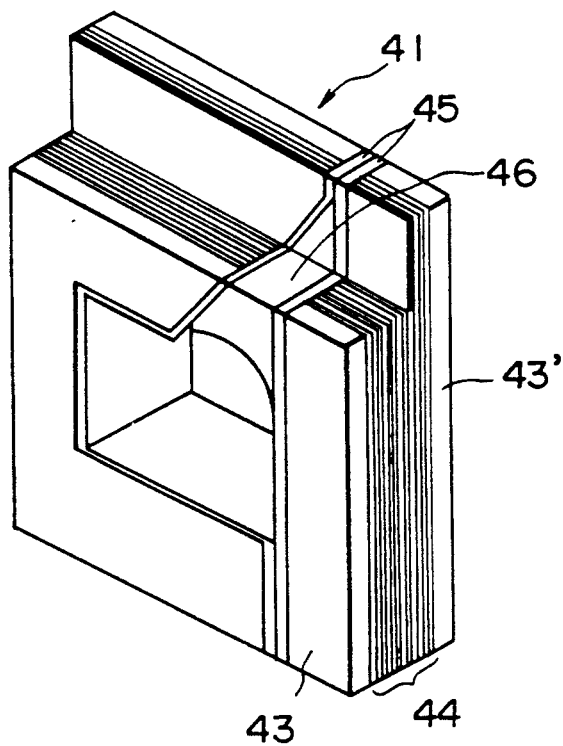
FIG. 5 is a perspective view of a laminate-type magnetic head core to be used for the composite-type floating magnetic head of the present invention.

FIG. 5 is a perspective view of a laminate-type magnetic head core 41 which is used for the composite-type floating magnetic head of the present invention.

Laminated film 44 of soft alloy magnetic films and insulation films is held between non-magnetic substrates 43 and 43' which constitute a half core and the half core is combined with another half core with a gap control film 45 maintained between them, and is then reinforced with glass 46.

A slider made of the non-magnetic substrate material of the present invention was used for a composite-type floating magnetic head and a thin film head with this laminate-type magnetic head core, and similar property tests were conducted, with satisfactory results being achieved.

The non-magnetic substrate material can be used for a compact high-density recording magnetic disk unit to improve the CSS property of a low floating magnetic head and also to provide improved reliability with less malfunctions. The present invention is not limited to the above embodiments, and numerous modifications may be made within the scope specified in the claims and their equivalents.

What is claimed is:

1. A non-magnetic substrate material comprising: 0.5%–3% of Al$_2$O$_3$ and 3%–16% of one or a mixture of ZnO or SnO$_2$ under the condition that the total amount of ZnO and SnO$_2$ is equal to or less than 16%, in addition to main components of 45%–60% of TiO$_2$, 5%–20% of BaO and 20%–35% CaO by weight.

2. The non-magnetic substrate material of claim 1, wherein the material contains a further addition of 0.01%–6% by weight of one or a mixture of NiO, SrO, MgO, Y$_2$O$_3$, WO, MoO$_3$, In$_2$O$_3$ or ZrO$_2$.

3. The non-magnetic substrate material of claim 1, wherein said material is used for sliders for composite-type floating magnetic heads.

4. The non-magnetic substrate material of claim 2, wherein said material is used for sliders for composite-type floating magnetic heads.

5. The non-magnetic substrate material of claim 1, wherein said material is used for sliders for thin film-type floating magnetic heads.

6. The non-magnetic substrate material of claim 2, wherein said material is used for sliders for thin film-type floating magnetic heads.

7. A floating-type magnetic head slider comprising: a non-magnetic substrate material with main components of 45%–60% of TiO$_2$, 5%–20% of BaO and 20%–35% CaO by weight, and further components of 0.5%–3% of Al$_2$O$_3$ and 3%–16% of one or a mixture of ZnO or SnO$_2$ under the condition that the total amount of ZnO and SnO$_2$ is equal to or less than 16%.

8. The slider of claim 7, wherein the slider is a composite floating-type magnetic head slider.

9. The slider of claim 7, wherein the slider is a thin film floating-type magnetic head slider.

10. The slider of claim 7, wherein the non-magnetic substrate material has a hardness of less than 800 Kg/mm$^2$.

11. The slider of claim 7, wherein the floating-type magnetic head has a coefficient of friction of less than 0.7.

* * * * *